US009436940B2

United States Patent
Tremlet

(10) Patent No.: US 9,436,940 B2
(45) Date of Patent: Sep. 6, 2016

(54) EMBEDDED SECURE ELEMENT FOR AUTHENTICATION, STORAGE AND TRANSACTION WITHIN A MOBILE TERMINAL

(75) Inventor: Christophe Tremlet, Aubagne (FR)

(73) Assignee: Maxim Integrated Products, Inc., San Jose, CA (US)

( * ) Notice: Subject to any disclaimer, the term of this patent is extended or adjusted under 35 U.S.C. 154(b) by 271 days.

(21) Appl. No.: 13/544,893

(22) Filed: Jul. 9, 2012

(65) Prior Publication Data

US 2014/0013406 A1    Jan. 9, 2014

(51) Int. Cl.
*G06F 21/70* (2013.01)
*G06Q 20/32* (2012.01)
*G06F 21/32* (2013.01)

(52) U.S. Cl.
CPC ........... *G06Q 20/3227* (2013.01); *G06F 21/32* (2013.01); *H01L 2224/48091* (2013.01); *H01L 2224/48227* (2013.01)

(58) Field of Classification Search
None
See application file for complete search history.

(56) References Cited

U.S. PATENT DOCUMENTS

| 8,249,654 B1* | 8/2012 | Zhu ............................... 455/558 |
| 2001/0033012 A1* | 10/2001 | Kommerling et al. ....... 257/679 |
| 2007/0094710 A1* | 4/2007 | Walker et al. .................... 726/2 |
| 2007/0147619 A1* | 6/2007 | Bellows et al. .............. 380/277 |
| 2008/0083936 A1* | 4/2008 | Huynh et al. .................. 257/203 |
| 2008/0155275 A1* | 6/2008 | Natarajan et al. ............ 713/193 |
| 2009/0097459 A1* | 4/2009 | Jendbro et al. ............... 370/338 |
| 2009/0146270 A1* | 6/2009 | Buer et al. ..................... 257/659 |
| 2009/0265544 A1* | 10/2009 | Moona et al. ................. 713/156 |
| 2010/0169670 A1* | 7/2010 | Sip ................................. 713/193 |

* cited by examiner

*Primary Examiner* — Benjamin Lanier
(74) *Attorney, Agent, or Firm* — North Weber & Baugh LLP

(57) ABSTRACT

Various embodiments of the present invention relate to incorporating an embedded secure element into a mobile device, and more particularly, to systems, devices and methods of incorporating the embedded secure element into a mobile device for identity authentication, data storage and processing in trusted transactions. These trusted transactions require a high security level to protect sensitive data or programs in bank account management, purchasing orders, contactless payment, passport verification, and many other high-security applications. The secure element will provide a root of trust such that that applications running on the mobile device are executed in a controlled and trusted environment. In addition to conventional password or encryption protection, alternative security features are introduced from both software and hardware levels based on the embedded secure element. Therefore, the security level of the mobile device is not only enhanced, but also may potentially exceed that of the conventional POS terminals.

20 Claims, 11 Drawing Sheets

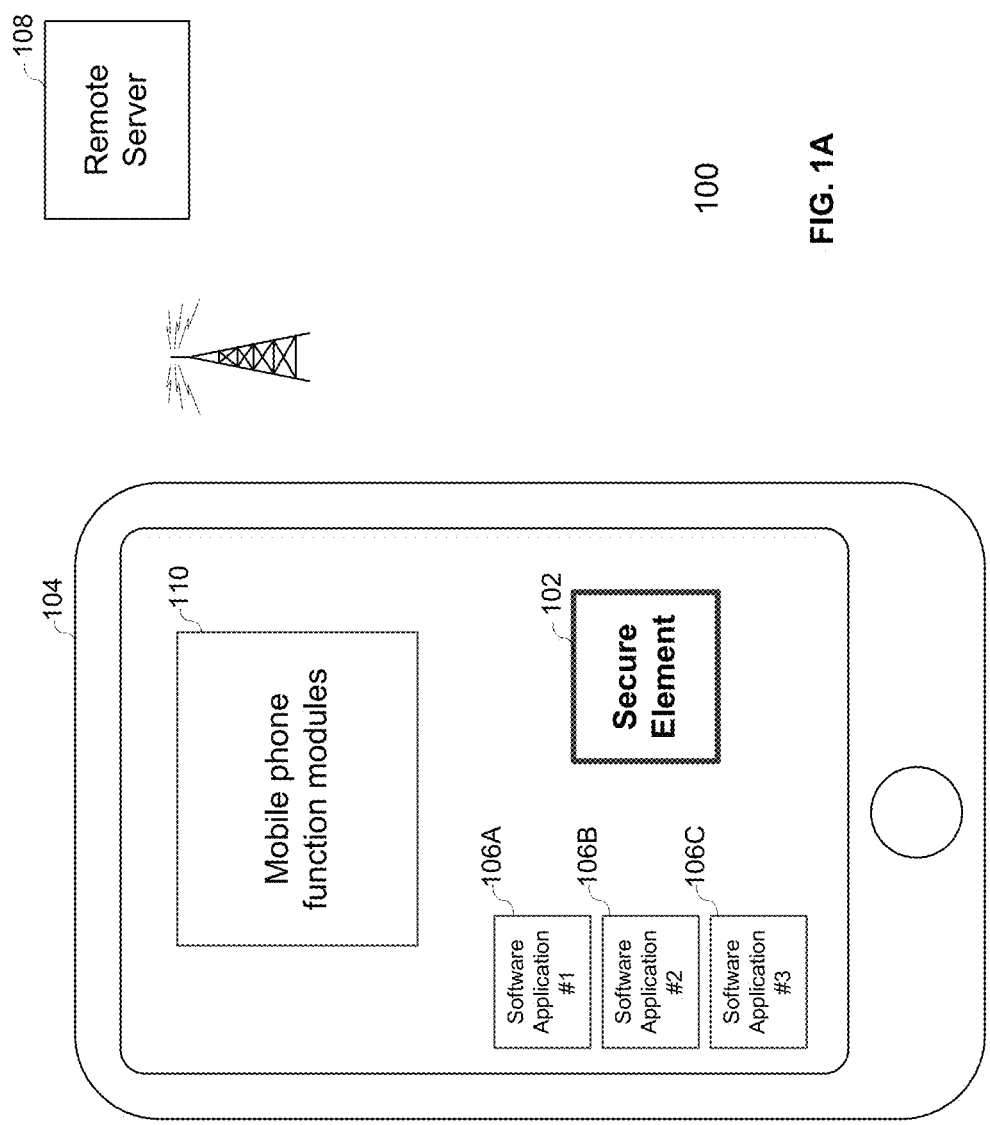

EMBEDDED SECURE ELEMENT FOR AUTHENTICATION, STORAGE AND TRANSACTION WITHIN A MOBILE TERMINAL

BACKGROUND

A. Technical Field

The present invention relates generally to an embedded secure element in an electronic mobile terminal, and more particularly, to systems, devices and methods of incorporating the embedded secure element into the mobile terminal for authentication, storage and processing in trusted transactions.

B. Background of the Invention

Not until recently, financial transaction has been implemented by a limited number of methods, including face-to-face cash exchange at bank or sale counters, automatic teller machine (ATM) transaction, credit card payment via a specialized reader, and internet transaction by inputting credit or debit card information. Although face-to-face transaction has been the most conventional business method for many centuries, the ATM machine, credit card reader and internet emerged and dominated as secure point-of-sale (POS) terminal devices during the last few decades. These secure POS terminal devices are normally hardwired to the telephone network or internet, and can read account information, contact the bank and transfer approved monetary amount. They may also have the capability to authenticate the cardholder through its PIN code or through biometric means. These POS terminals have been widely applied in retail and hospitality industries.

Regardless of the POS terminals, customers have to carry a debit or credit card which is embedded with a magnetic strip or carries an integrated circuit. The magnetic strip is used to store the customer's personal account information. In most debit or credit cards, authentication of a cardholder is limited to the cardholder's signature and/or a password, such that minimum efforts are required from the cardholder and the technical barrier may be significantly reduced for average people. Despite its convenience for use, credit cards are always faced with security threats. Once a thief steals a card, he or she may conveniently fake the signature, or decipher the password that sometimes includes only four digits.

A variety of technologies are used in the POS terminals to maintain security of the sensitive account and transaction information. The ATM machine adapts anti-tamper circuitry and physical security mesh to prevent tamper attacks by thieves. Financial transaction via the internet may involve additional authentication and encryption for data exchange between local computers and remote servers that are owned by the banks, credit card companies or retailers. Although these anti-tamper technologies have made significant progress, security of POS terminals is always a concern as the tamper attempts are more and more sophisticated.

Mobile phones were initially introduced as communication terminals to receive and make phone calls via a radio link, but they have recently been used in financial transaction. Application of mobile phones has dramatically changed our traditional perspectives on the POS terminals by allowing each individual customer to own his or her own financial terminal. Unprecedented flexibility and mobility is promised by this new trend. In particular, a term, "mobile banking," is developed concerning financial activities via a mobile device, including balance checking, bank transfer, and credit card payments.

In mobile banking, the conventional mobile phone may be conveniently configured to a mobile POS terminal by a software application. The software application is installed on the mobile phone upon a request by the user, and normally each retailer or bank may support its own application that has a unique interface. User name and password for each bank or retailer may be conveniently remembered by the application. The mobile POS terminal optionally includes an accessory card reader to read the account information from the credit or debit card; however, the information may also be directly input by the user through the keyboard or touch screen of the mobile phone. Therefore, the mobile POS terminal has been configured as a combination of a card reader and the internet except its capability of wireless communication.

Near Field Communication (NFC) technology has introduced another mobile payment scheme. More specifically, NFC-enabled mobile phones are equipped with an integrated circuit connected to an antenna allowing it to communicate through radio with other objects in a short range, typically 0 to 10 cm. As per the NFC ISO standard 18092, an NFC reader can establish a contactless radio communication with an NFC enabled handset in so called card emulation mode and run a transaction. In this situation, the mobile device behaves like a contactless smartcard. The NFC enabled handset enables an electronic financial transaction as a card with magnetic stripe or traditional smartcard does, except that NFC communication exempts a requirement for physical contact between the card and the reader.

Although the mobile phone itself provides one more layer of password protection, security features for mobile banking are limited and cannot compare to the existing security levels in the conventional POS terminals. When the user name and password are remembered by the software applications, anyone that hackled the mobile phone can get access to the account. Authentication and encryption techniques are similar to those applied in conventional financial transaction via the internet. Therefore, although the existing mobile banking has fundamentally changed the format of financial transaction, security in a Secure Digital (SD) memory card or as a smart card, such as a subscriber identity issues are never addressed, and to certain extent, are even compromised to gain the benefits of flexibility and mobility.

In some state-of-the-art mobile terminals, the main processor may have a trusted mode of operation, and removable secure elements might be integrated module (SIM) card or a universal integrated circuit card (UICC), to create secure environments for trusted transactions. Logical separation of software execution is created in a trusted mode of operation for sensitive applications in addition to a normal mode for non-sensitive applications. However, physical security for tamper resistance is not available for this trusted mode of operation or any of these cards that are converted from the conventional cell phone hardware.

SUMMARY OF THE INVENTION

Various embodiments of the present invention relate to incorporating an embedded secure element into a mobile electronic equipment with secure transactions capability, and more particularly, to systems, devices and methods of incorporating the embedded secure element into a mobile device for identity authentication, data storage and processing in trusted transactions. These trusted transactions require a high security level to protect sensitive data or programs in bank account management, purchasing orders, contactless payment, passport verification, and many other high-security applications. The secure element will provide a root of trust such that that applications running on the mobile device are executed in a controlled and trusted environment. In addition to conventional password or encryption protection, alternative security features are introduced from both software and hardware levels based on the embedded secure element. Therefore, the security level of the mobile device is not only largely enhanced, but also potentially exceeds that of the conventional POS terminals or smartcards.

One aspect of the invention is a secure element that is embedded in a mobile device and reserved to process a trusted transaction. The secure element comprises a secure memory, a secure processor, a verification/authentication unit, and a cryptographic processor. The secure processor receives and processes a request for the trusted transaction. This trusted transaction is associated with an operation selected from writing the sensitive data into the secure memory and reading the sensitive data from the secure memory. Once the secure processor receives the request for the trusted transaction, the V/A unit first verifies and authenticates the trusted transaction and a user that makes the request. The cryptographic processor encrypts the sensitive data prior to writing the sensitive data into the secure memory, and decrypts the sensitive data prior to reading the sensitive data from the secure memory.

One aspect of the invention is a secure element that is integrated on a power management integrated circuit (PMIC) chip in a mobile device. A request for the trusted transaction is processed in the secure element such that a sensitive data is written into the secure memory or from the secure memory. The trusted transaction is synchronized in the secure element using a real-time clock shared over the PMIC chip.

One aspect of the invention is a method of processing a trusted transaction in a secure element. The secure element is embedded in a mobile device and reserved to process the trusted transaction. When a request for the trusted transaction is received and processed, the trusted transaction and a user making the request is verified and authenticated. Thereafter, a sensitive data is encrypted and written into the secure memory in a write operation, or read from the secure memory and decrypted in a read operation.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 1A illustrates a block diagram of a mobile terminal that incorporates a secure element in a smart mobile phone according to various embodiments in the invention.

DETAILED DESCRIPTION OF THE PREFERRED EMBODIMENTS

Figure 1C:
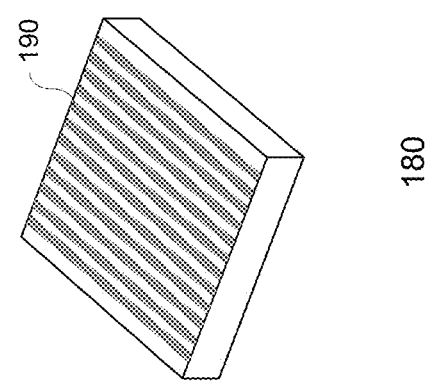
FIG. 1C illustrates an alternative physical countermeasure based on a monolithic anti-tamper security mesh according to various embodiments in the invention.

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the present invention relate to incorporating an embedded secure element into a mobile device such as a mobile phone handset, tablet, mobile POS, and more particularly, to systems, devices and methods of incorporating the embedded secure element into the mobile device for authentication, storage and processing in trusted transactions. The secure element is particularly reserved for trusted transaction that requires a high security level to protect sensitive data, programs or applications in a trusted environment. These trusted transactions comprise bank account management, purchasing orders, passport verification, and many other high-security applications. In addition to conventional password or encryption protection, alternative security features are introduced from both software and hardware levels by using the embedded secure element. Therefore, the security level of the mobile equipment is not only largely enhanced, and will potentially exceed that of the conventional POS terminals.

FIG. 1A illustrates a block diagram 100 of a mobile device that incorporates a secure element 102 in a smart mobile phone 104 according to various embodiments in the invention. The mobile device 100 is configured from the conventional mobile phone 104 which is primarily used for communication. Software applications 106A-106C are installed on the mobile phone 104 to receive requests for various trusted transactions. Generic mobile phone function modules in the smart mobile phone 104 and the secure element 102 are coordinated to process the requests and communicate with remote servers 108 to complete the trusted transactions. The secure element 102 is assembled within the mobile phone 104 by the manufacturer prior to delivery to a user, and thus, the secure element 102 is always linked with the particular mobile POS terminal that it is sold with.

The secure element 102 are used in the mobile device 100 to create a local trusted environment in which trusted operations are implemented on sensitive data, including valuable assets or sensitive information. In various embodiments of the invention, the secure element 102 is provided as a generic secure element or a specialized secure element within each mobile phone 104 according to its application.

The generic secure element is not associated with any particular user or financial entities, e.g., banks, retailer or credit card companies. Once the mobile device 100 is delivered to the user and relevant software applications are installed, the generic secure element is configured and associated with the particular user and the financial entities that he or she chooses to use. Sensitive data may be stored and processed within the secure element 102, and this sensitive data includes account numbers, access codes, financial transactions/balances, rights management, metering data (e.g., energy, units), program algorithms, cryptographic keys and certificates, and other information.

The specialized secure element is reserved for extremely high-security application, e.g., passport and driver's license or banking card emulation. Such a specialized secure element may be provided to the device manufacturer by a special government agency or financial institution that takes charge of the high-security application, keys and credentials. The special agency may reserve an exclusive right to access to the secure element 102. Sensitive data stored and processed within the secure element 102 may include passport information, personal identify, credit history, cryptographic keys and certificates and other information. The sensitive data may be preloaded to the secure element 102, or loaded at designated stations managed by the special agency after a particular user receives the mobile phone.

Figure 1B:
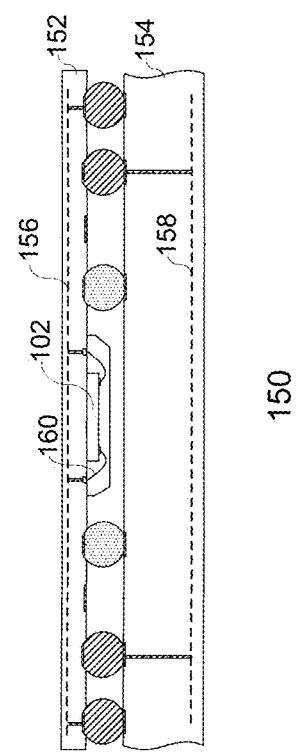
FIG. 1B illustrates an exemplary physical countermeasure to deter a tamper attempt to the secure element according to various embodiments in the invention.

A thief or hacker may attempt to gain access to sensitive data or operations within the secure element 102, and FIG. 1B illustrates an exemplary physical countermeasure 150 to deter a tamper attempt to the secure element 102 according to various embodiments in the invention. The secure element 102 is sandwiched between a top ball grid array (BGA) package 152 and a bottom BGA package 154. Anti-tamper security meshes 156 and 158 are respectively embedded within the substrates of the top and bottom BGA packages. The secure element 102 is mounted on the top BGA package 152, and coupled to the security mesh 156 via ultrasonic wire bonding 160. The security meshes 156 and 158 are further coupled after the BGA packages 152 and 154 are flip-chip bonded together via a plurality of BGA bond balls. Therefore, an anti-tamper security network is formed to enclose the secure element 102, and protect it from tamper attempts.

FIG. 1C illustrates an alternative physical countermeasure 180 based on a monolithic anti-tamper security mesh 190 according to various embodiments in the invention. The security mesh 190 is monolithically integrated in the interconnect layers that lie on top of the secure element 102. An anti-tamper security network is formed between this security mesh 190 and an anti-tamper detection circuit within the secure element 102. Compared to the physical countermeasure 150, this monolithic approach offers a better form factor that some compact smart phones demand.

Figure 2A:
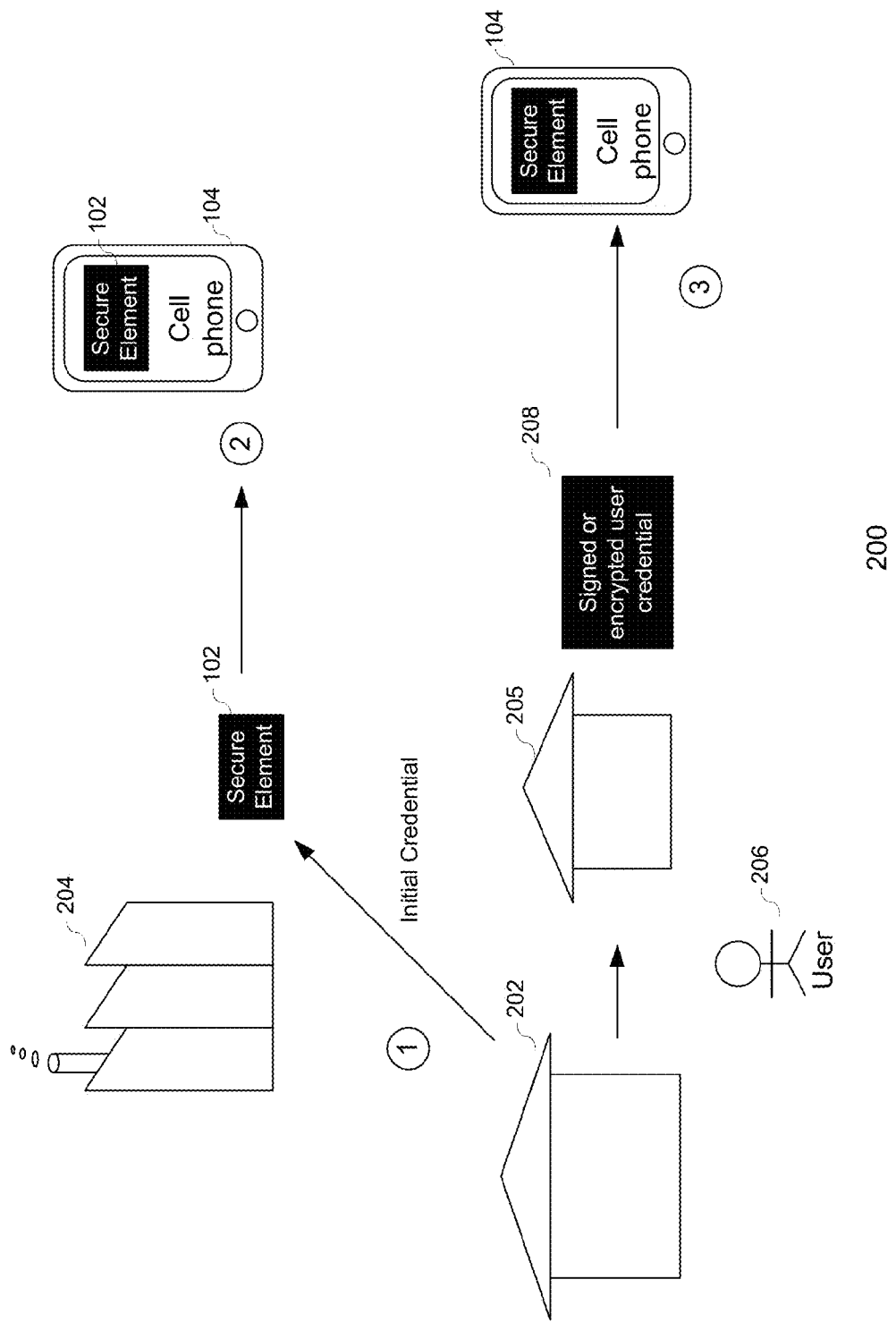
FIG. 2A illustrates an exemplary method for configuring a secure element with credentials according to various embodiments in the invention.

Prior to any trusted transaction, the secure element 102 is manufactured and configured according to various secure applications. FIG. 2A illustrates an exemplary method 200 of configuring a secure element 102 with credentials according to various embodiments in the invention. The secure element 102 may be a generic or specialized secure element used in financial transactions or other high-security applications. Protecting the credentials against theft is extremely critical, because an attacker could use them to forge a fake identity or proceed to illegal banking transactions. Therefore, credentials are provided by a central government, bank, or credit card company 202 in a highly secure environment. Credential programming may be completed in local authorized agencies with a medium/moderate security level, accommodating the reality that not all local agencies can afford a highly secure environment. As a result, the method 200 of configuring the secure element 102 allows the mobile phone 104 to be programmed with the credentials in a moderately secure environment, while avoiding the major risk of credentials disclosure or theft.

Initially, while the secure element 102 is manufactured in a highly secure factory 204, a root or initial credential is provided by the central government, bank or credit card company 202. The initial credential is programmed to the circuit in the secure element 102. This credential may be a secret key or a public key. The public key is used with a certificate. Although the public key is maintained at a relatively low security level, the certificate is controlled by the government, bank, or credit card company 202, and securely stored in a way that guarantees its integrity. The above credential programming process has to be implemented in a highly secure environment, and thereafter, the programmed secure element 102 is shipped and incorporated into the mobile phone 104.

As the specific user 206 makes a request to associate his or her mobile phone 104 with some applications, the central government, bank or credit card company 202 issues the corresponding credentials to consummate the request. In particular, the credentials are sent to the local government agent or the local bank branch 208. In one embodiment, the credential is sent encrypted with the secret key initially programmed in the factory 204. A Message Authentication Code (MAC) might be associated with the credential. Once the secure element 102 receives the user credential, it decrypts it using the initial secret key programmed in the factory 204 and checks its MAC. If both decryption and MAC verification are successful, the user credential is authenticated, and subsequently, programmed into the secure element 102. In another embodiment, the user credential is signed with the private key associated to the public key which was programmed in the secure element at the prior manufacturing stage. The secure element 102 checks the digital signature of the user credential. If verification is successful, the user credential is programmed in the secure element 102. In each of these embodiments, user-specific credential programming happens in the local government or bank branch 208, and the credentials are programmed only if authentication is successful. In this way, only user-specific credentials authenticated by the highest authority level may be programmed in the secure element 102 and used to prevent identity theft.

In some embodiments, the application software itself is very sensitive, and the user has to make sure the application software can be trusted to process sensitive data. A hacker may inject a fake banking application that captures the PIN codes used in user authentication and sends it over to a criminal organization. Other fake applications may reveal sensitive personal authentication data like fingerprints or retina images. To avoid this, the application might be digitally signed, and verified according to the method 200 based on initially programmed private or public key in the secure element 102 before the application is installed in the mobile phone 104.

Figure 2B:
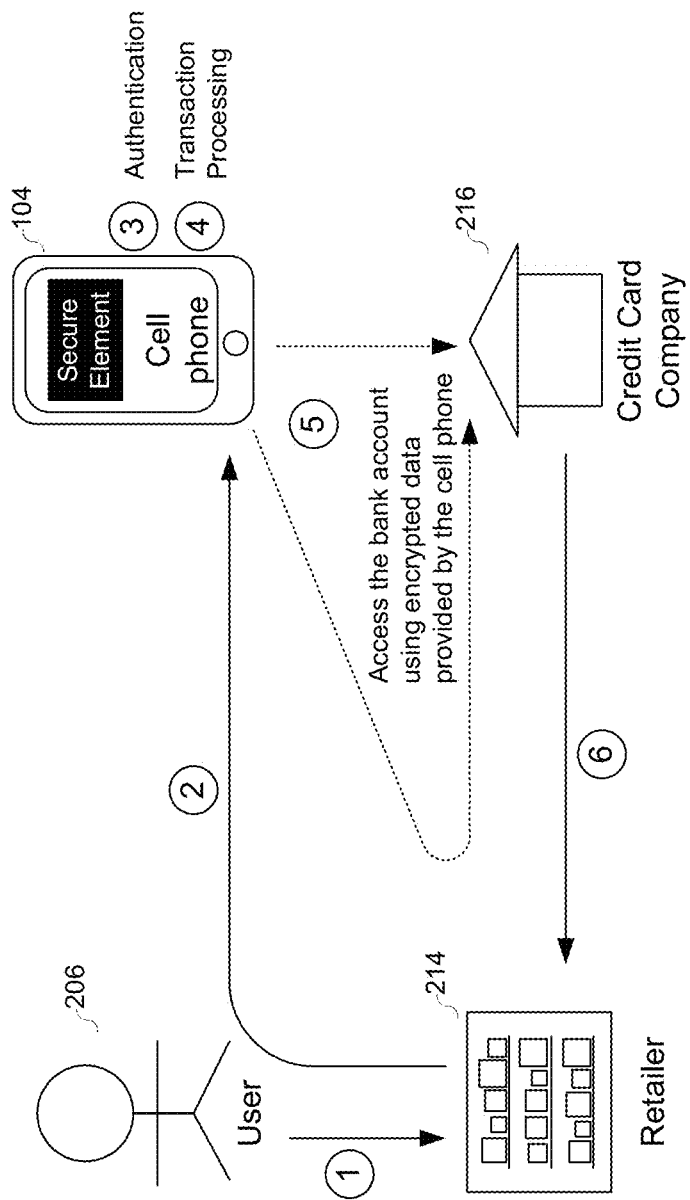
FIG. 2B illustrates an exemplary process of a trusted transaction among a user, a retailer and a credit card company using the mobile terminal according to various embodiments in the invention.

FIG. 2B illustrates an exemplary process 210 of a trusted transaction among a user 206, a retailer 214 and a credit card company 216 using the mobile device 100 according to various embodiments in the invention. The secure element 102 incorporated in the mobile device 100 is a generic secure element, and used to authenticate the parties, store sensitive data and process the transaction. The user 206 makes a request to the mobile terminal 100 to pay the retailer 214 by a credit card issued by the credit card company 216. The secure element 102 in the terminal 100 authenticates the retailer 214 and/or the user 216, processes the request, and communicates with the credit company 216. Thereafter, the credit company 216 may communicate with the retailer directly or indirectly via the mobile device 100 to complete the transaction. When the user 206 makes a request to pay via his bank account, the related bank is involved to replace the role of the credit card company 216. In the process 210, data are always exchanged among the involved parties in encrypted formats to ensure a high security level.

Figure 2C:
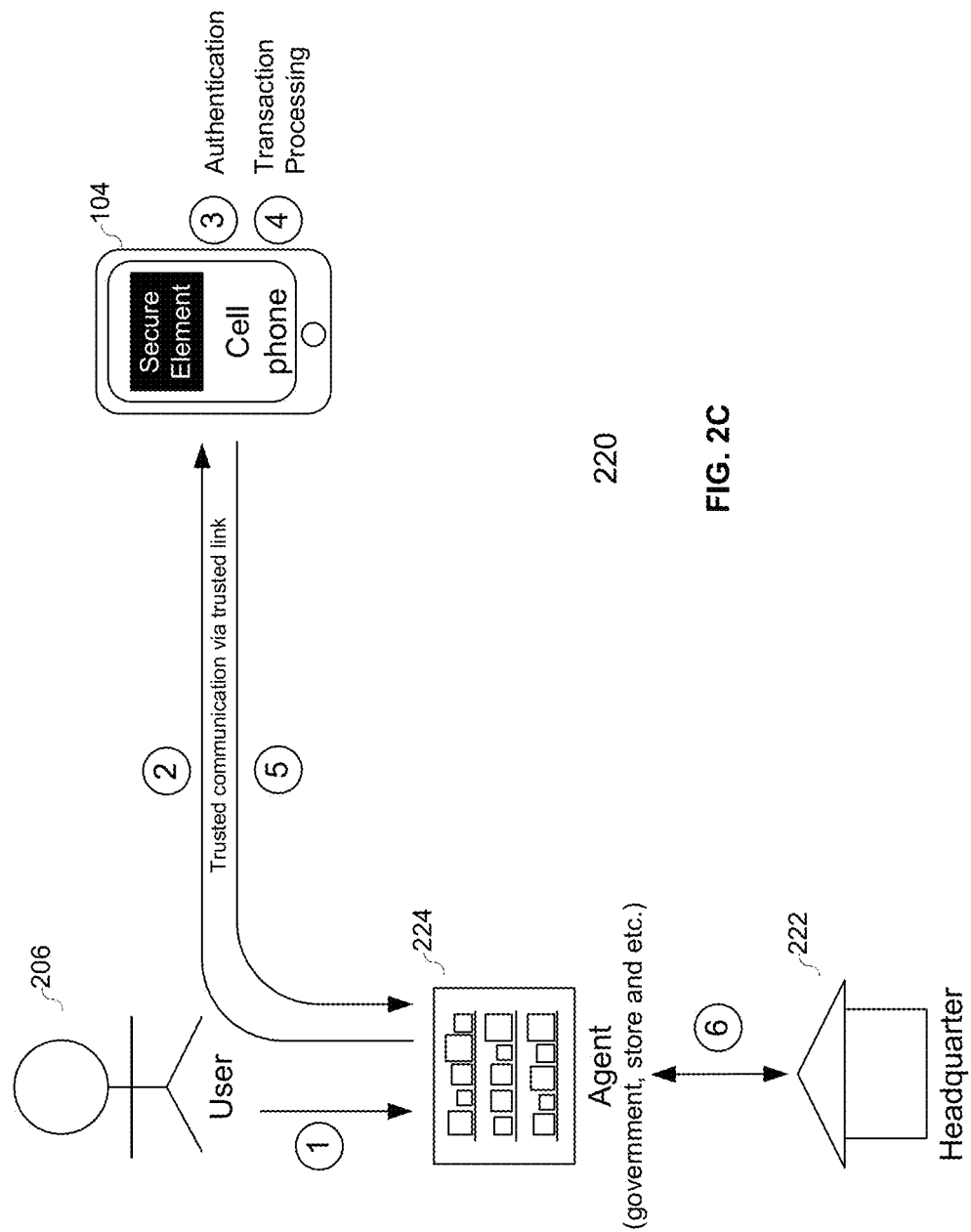
FIG. 2C illustrates an exemplary process of a trusted transaction among a user and a government when the mobile terminal is used as a passport according to various embodiments in the invention.

FIG. 2C illustrates an exemplary process 220 of a trusted transaction among a user 206 and a government when the mobile device 100 is used as a passport according to various embodiments in the invention. The secure element 102 incorporated in the mobile device 100 is a specialized secure element. It may be issued by the government or by a dedicated agency. It is controlled exclusively by the government in the sense that it stores credentials issued and controlled by said government. The secure element 102 may withhold sensitive data, such as the passport number, fingerprint, criminal history, custom record, and legitimate passport agent numbers.

In this passport application, the secure element 102 is used to authenticate the involved parties, store sensitive data and process the transaction. The user 206 approaches an agent station 224, and the agent at the station 224 makes an access request to the mobile device 100. The secure element 102 in the terminal 104 authenticates the agent 224 and/or the user 206, processes the request, and communicates back with the agent station 224. Thereafter, the agent station 208 communicates with the headquarter 222 to process the request. In various embodiments, the agent station 224 may retrieve sensitive data, write new data or modify existing sensitive data in the secure element 102. In the process 220, data exchanged are at least cryptographically signed to ensure a high security level, while in preferred embodiments, hardwire links are further established between the agent station 224 and the mobile terminal 100 to allow secure data transfer.

One of those skilled in the art will see that the specialized secure element requires a better controlled data path between the mobile device 100 and the agent 224 than that for a generic secure element. This requirement is associated with its higher security needs. However, if a similar security level is needed for the generic secure element, the generic secure element may adopt some of the security features, including this data path control, that are used in the specialized secure element.

Figure 3:
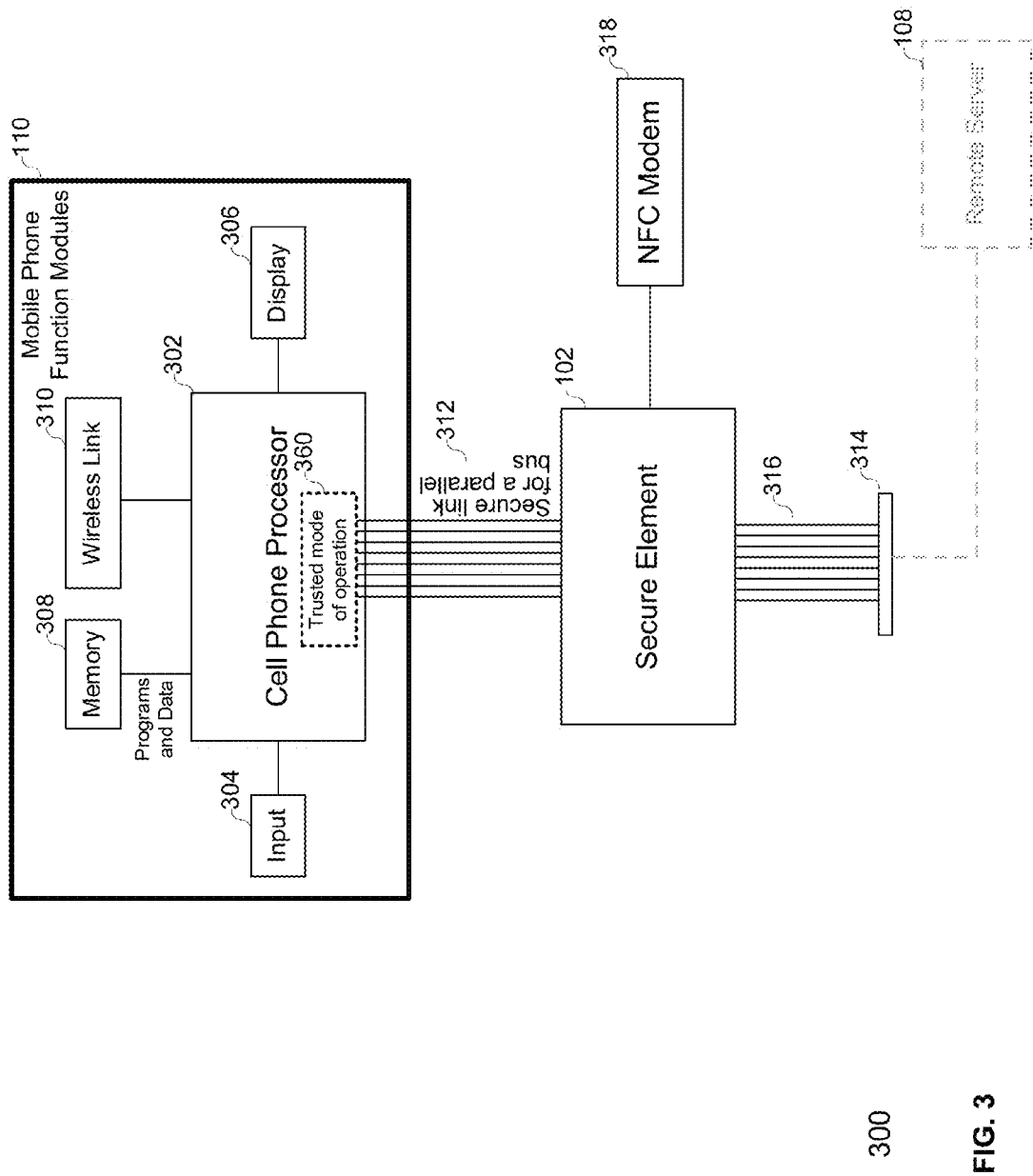
FIG. 3 illustrates an exemplary block diagram of a mobile terminal that includes a secure element and function modules in the conventional mobile phone according to various embodiments in the invention.

FIG. 3 illustrates an exemplary block diagram 300 of a mobile device that includes the secure element 102 and function modules 110 in the conventional mobile phone 104 according to various embodiments in the invention. The mobile phone function modules 110 are mainly associated with traditional wireless communication functions of the mobile phone 104, while the secure element 102 is embedded to store sensitive data and process requests for trusted transactions.

The mobile phone function modules 110 comprise a cell phone processor 302, an input device 304, a display 306, a memory 308 and a wireless link 310. Software applications are loaded and stored in the memory as instructions that control the cell phone processor 302. The input device 304 is used to receive user input. In certain embodiments, the input device 304 is a keyboard or a touch screen. The cell phone processor 302 is the central processing unit of the mobile phone 104 that implements instructions in a particular software application selected according to the user input. The display device 306 provides a user-friendly interface that allows the user to interact with the application and monitor the progress. The wireless link 310 couples the mobile device 104 to a universal cellular network. In particular, electrical signals are converted to electromagnetic signals transmitted over a wide geographic area as far as the mobile phone 104 remains in the universal cellular network.

The cell phone processor 302 comprises a trusted mode of operation 360 that is used to execute trusted transactions. Like the conventional cell phone, logical separation of software execution is created in a trusted mode for sensitive applications in addition to a normal mode for non-sensitive applications. However, due to its limited physical security, the processor enabling trusted mode of operation 360 needs to be coupled to a secure element 102 to complete the trusted transaction.

In one embodiment, the secure element 102 is coupled to the mobile phone function modules 110 using a secure link 312. The secure link 312 may be a synchronous serial data link, such as a serial peripheral interface (SPI) bus or an inter-integrated circuit (I2C) bus, that transfers time-multiplexed serial data. In various embodiments, the secure link 312 is patterned on a printed circuit board (PCB) on which the secure element 102 and the mobile phone function modules 110 are assembled, and in particular, the secure link 312 is protected from tamper attempts if anti-tamper countermeasures depicted in FIGS. 1B and 1C are employed. In some embodiments, the secure link 312 may be protected by a secure mesh either in the form of an external envelope or embedded in the PCB. The mesh can be connected to the tamper monitor 480, to detect physical intrusion. Tamper detection may trigger key destruction in the key storage 490. Alternatively data transmitted on the secure link 312 can be fully or partially encrypted.

The input device 304 and the display device 306 are used to receive a request, and to facilitate user interaction, respectively, in trusted transactions. In various embodiments, the user may use the keyboard or touch screen to select a retailer, input monetary value, and enter a password. However, sensitive data in trusted transactions is exclusively processed and stored within the secure element 102, and may be encrypted using a key stored in the secure element 102 prior to being transferred via the wireless link 310. In particular, data may be signed with a secret key stored in the secure element 102.

In another embodiment, the secure element 102 is coupled to a connector 314 of the mobile terminal 102 using a secure link 316 directly. The secure element 102 may be coupled to an external processing device via the connector 314, and the external processing device is associated with the remote server 108 owned by the retailers, agents or credit card companies. The secure link 316 and the connector 314 constitute a direct communication channel, and thus, the secure element 102 does not need to share the user interface 304/306 or the wireless link 310 with the mobile phone 104. Particularly, in the passport application, the agent station may be coupled to the secure element 102 via the connector 314 using a hard wire. The government exclusively controls the access to the connector 102, and any unauthorized physical access may be regarded as a tamper attempt.

In certain embodiment, the secure element 102 is coupled to a near field communication (NFC) modem 318. The NFC modem 318, coupled to an antenna, allows the secure element to communicate through radio with other external NFC devices owned by the retailer or agent, when the mobile phone 104 touches or is brought to close proximity, usually within a few centimeters, of the other NFC devices. These other NFC devices are normally coupled to an external processor owned by the retailer or agent. The NFC modem 318 may be reserved for trusted transactions in the secure element 102, or shared between the trusted transactions and many other applications in the mobile phone 104.

Figure 4A:
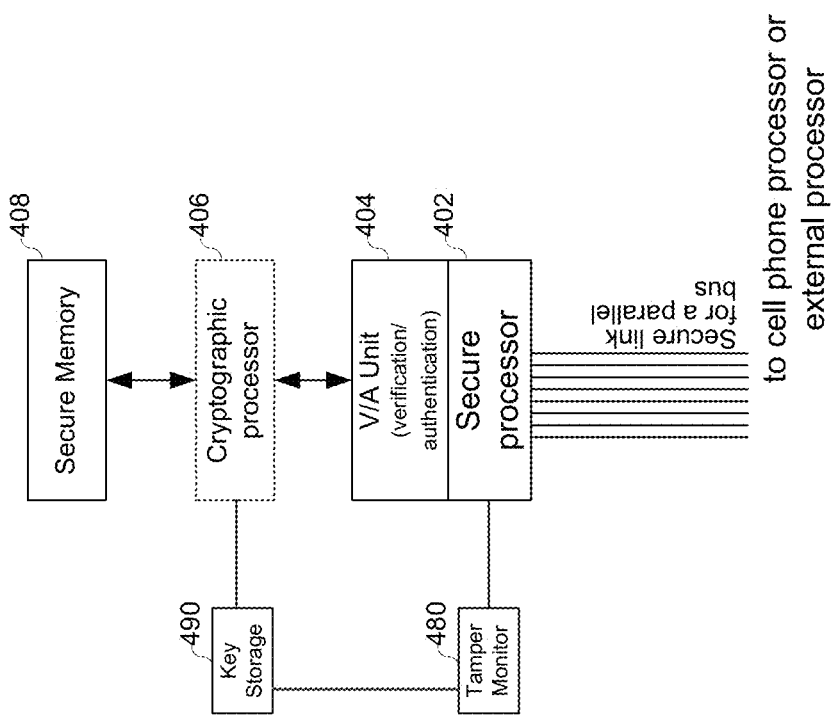
FIG. 4A illustrates an exemplary block diagram of a secure element according to various embodiments in the invention.

FIG. 4A illustrates an exemplary block diagram 400 of a secure element 102 according to various embodiments in the invention. The secure element 102 comprises a secure processor 402, a verification/authentication (V/A) unit 404, and a secure memory 408. The secure element 102 may further comprise a tamper monitor 480 that is coupled to the secure processor 402 and to a key storage 490. The tamper monitor 480 detects a variety of tamper attempts ranging from breaking through the physical anti-tamper security mesh to identifying a disguised fake identity use. Tamper attempts might be reported to the secure processor 402, and also trigger sensitive information destruction in the key storage 490. Sensitive data and programs are stored in the secure memory 408 and the key storage 490, and the trusted transaction involves read or write sensitive data and programs to the secure memory 408.

The secure processor 402 is coupled to receive a request for the trusted transaction. The secure processor 402 decrypts the request, controls access to the secure memory 408, and may encrypt or sign outgoing sensitive data according to the encrypted format. In some embodiments, the encrypted data or signature is computed using a key stored in the key storage 490.

Prior to access to the secure memory 408, both the user and the retailer or agent must be authenticated by the V/A unit 404. Such authentication constitutes an additional level of security that is hereby provided primarily for the trusted transaction in addition to conventional verification methods, e.g., mobile phone login or credit card password. In particular, the V/A unit 404 protects the credit or debit card from being charged for illegal transactions by unauthorized retailers, and also avoids a hacker to easily access the sensitive data in the secure memory 408.

In some embodiments, the secure element 102 may further comprise a cryptographic processor 406, such that sensitive data and/or programs may be stored in encrypted format within the secure memory 408. The cryptographic processor 406 encrypts and decrypts the sensitive data stored in the secure memory 408 for write and read operations, respectively. Keys may be used during cryptographic operations within the cryptographic processor 406, they might be stored in the key storage 490.

Figure 4B:
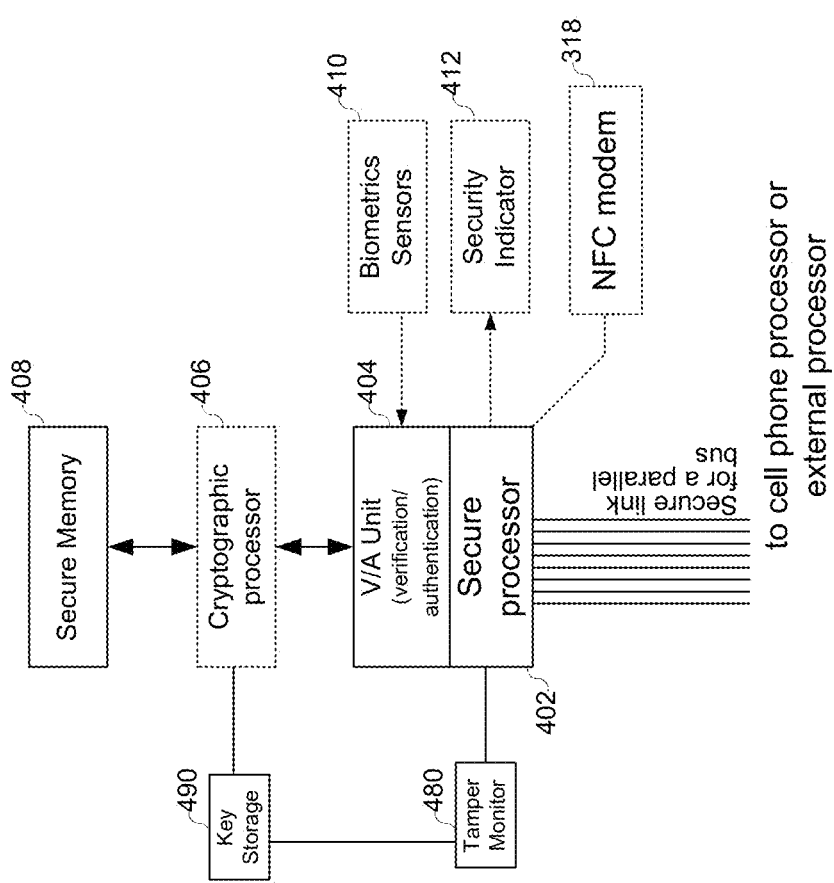
FIG. 4B illustrates another exemplary block diagram of a secure element according to various embodiments in the invention.

FIG. 4B illustrates another exemplary block diagram 450 of a secure element 102 that is coupled to a security indicator 412 and biometric sensors 410 according to various embodiments in the invention. The security indicator 412 shows the security level to the user on real time, and most importantly, sends warnings to the user once a tamper attempt is detected by the tamper monitor 480. The security indicator 412 may be implemented in either a software program or an embedded display. In one embodiment, the software program is enabled to display an alarming message on the display 306. In another embodiment, a light emitting diode (LED) is reserved at the input/output port of the mobile device 100, and the secure element 102 controls the LED to flash when a tamper attempt is detected.

The biometric sensors 410 are coupled to the V/A unit 404 for verification and authentication of user identity. The secure element 102 uses the input biometric data collected from the biometric sensor 410. The biometric data includes, but is not limited to, finger print, retina configuration, voice feature and many other personal characteristics. A thief has to provide exact matching biometric data to access the secure memory 408, even if the mobile device 100 has been physically in his or her possession, and even if the mobile login password has been deciphered. The security level for the trusted transaction may be greatly improved upon use of biometric data for user authentication/verification.

Figure 5A:
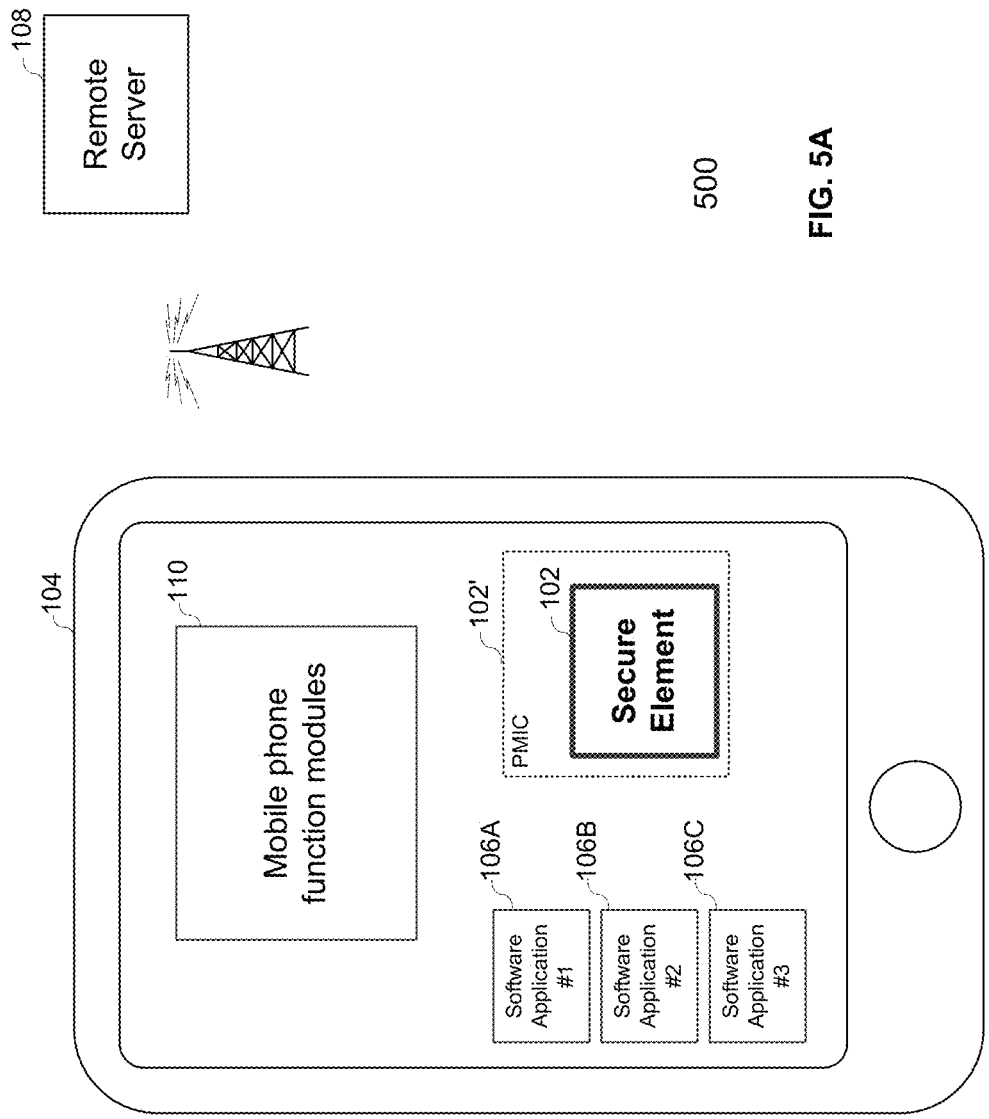
FIG. 5A illustrates a block diagram of a mobile terminal that incorporates a secure element in a PMIC chip within a smart mobile phone according to various embodiments in the invention.

In various embodiments of the invention, the embedded secure element 102 may be a dedicated component reserved for trusted transactions, and may be integrated in other existing components to create secure execution environments. One example of such components is a power management integrated circuit (PMIC) chip. FIG. 5A illustrates a block diagram 500 of a mobile terminal that incorporates a secure element 102 in the PMIC chip 102' within a smart mobile phone 104 according to various embodiments in the invention. The secure element 102 may still communicate with the external using the indirect secure link 312 via the cell phone processor 302, the direct secure link 316 via the connector 314, or the NFC modem 318.

Figure 5B:
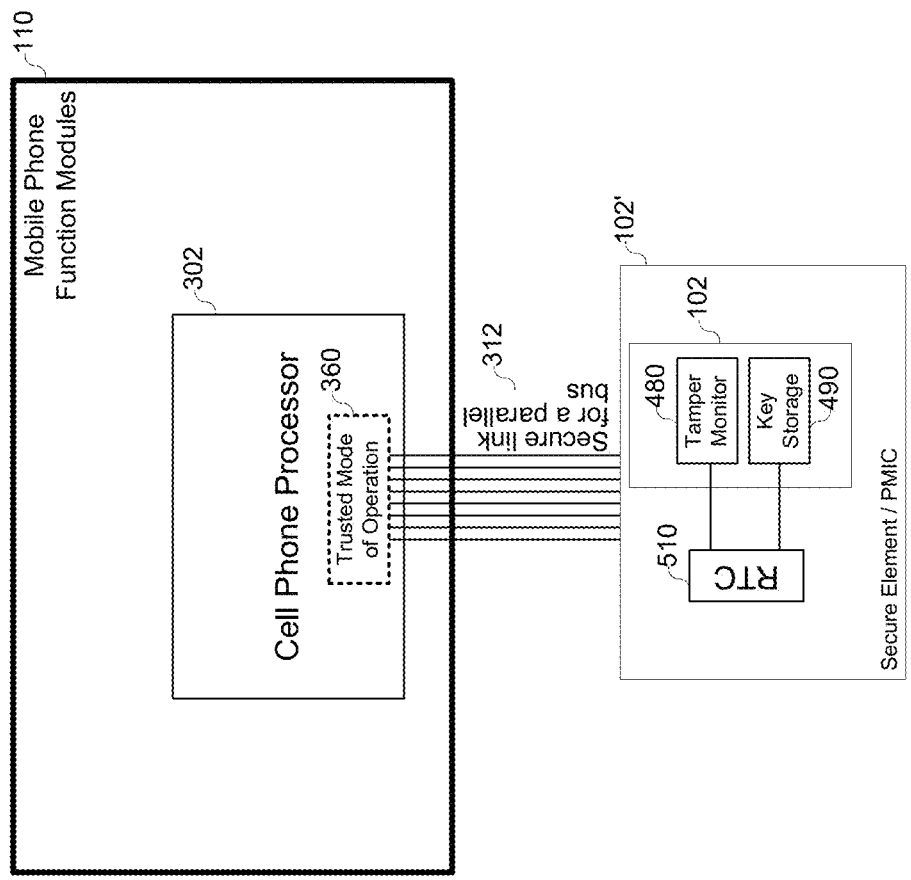
FIG. 5B illustrates an exemplary block diagram of a mobile terminal that includes a secure element embedded in a PMIC chip according to various embodiments in the invention.

FIG. 5B illustrates an exemplary block diagram 550 of a mobile device that includes the secure element 102 integrated with the PMIC chip 102' according to various embodiments in the invention. The PMIC chip 102' comprises a real-time clock (RTC) 510 that may be coupled to various components, e.g., the tamper monitor 480 and the key storage 490, in the secure element 102. In one embodiment, the PMIC chip 102' is coupled via an interface to a processor 302 enabling a trusted mode of operation 360 in the mobile phone function modules 110. This trusted mode of operation 360 is associated with at least one privileged mode of program execution, and the processor 302 is enabled to read an identification document, emulate an identification document, process a financial transaction, or authenticate the user.

Once the secure element 102 receives a request for a trusted transaction, the processor enabling the trusted mode of operation 360 may preprocess the request while the secure processor 402 further processes the request. The V/A unit 404 authenticates the user, the retailer or agent, and the transactions, and thereafter, sensitive data are extracted or stored within the secure memory 408 according to the request. In various embodiments of the invention, the secure element 102 may use a clock signal provided by the RTC 510 in power management to synchronize its operation.

Figure 6:
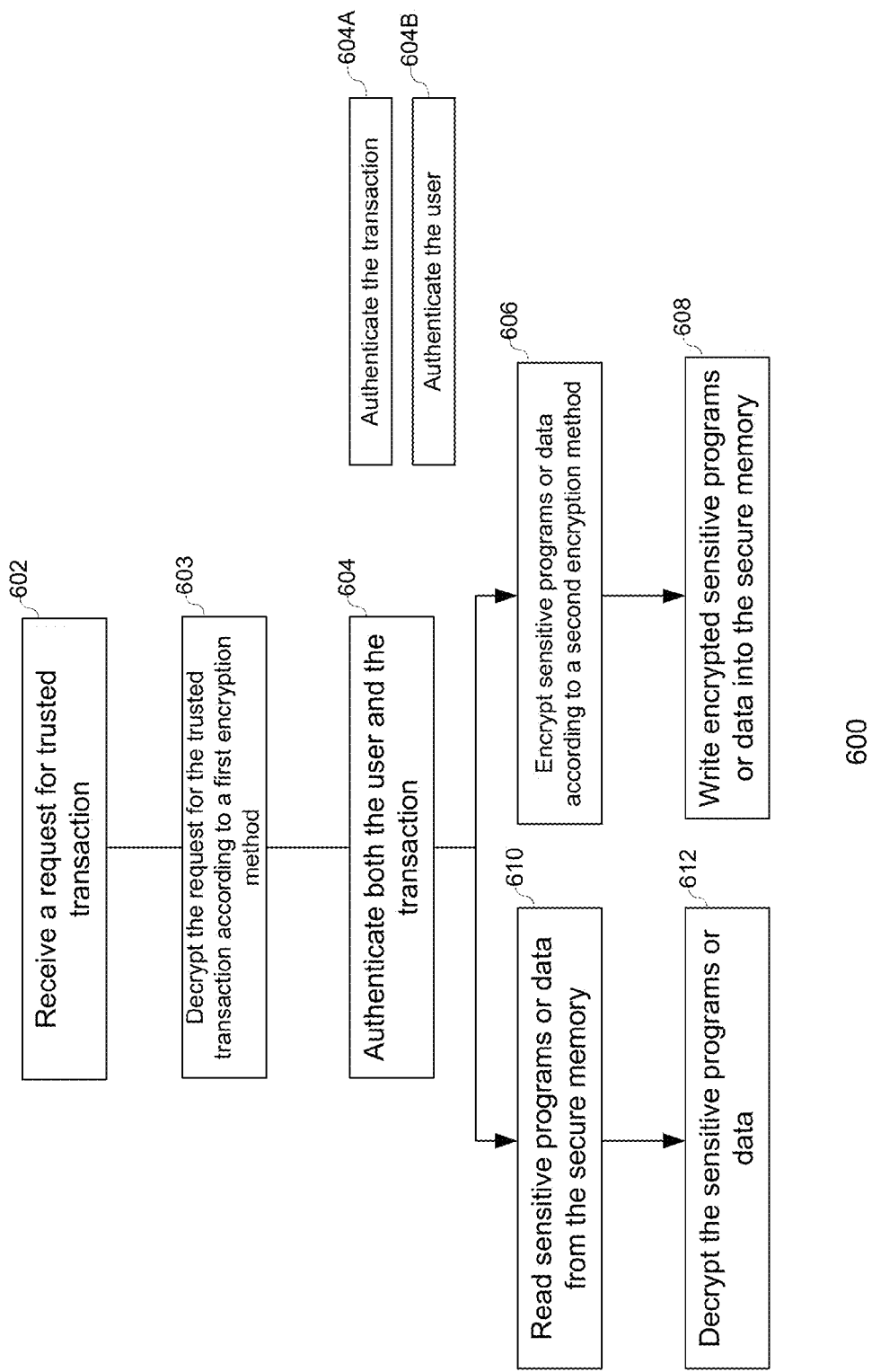
FIG. 6 illustrates an exemplary method of implementing a trusted transaction in the mobile POS terminal according to various embodiments in the invention.

FIG. 6 illustrates an exemplary method 600 of implementing a trusted transaction in the mobile terminal 100 that is based on an embedded secure element according to various embodiments in the invention. At step 602, the request for the trusted transaction is received by the secure processor 402 via the secure link 312 or 316 that is respectively coupled to the cell phone processor 302 or the external processing device. At step 603, the request for the trusted transaction is decrypted according to a first encryption protocol. In accordance, when the sensitive data needs to be communicated back to the retailer or agent, a first decryption method is applied to encrypt the data, and both the first and second decryption methods comply with a communication protocol and a security protocol.

At step 604, the V/A unit 404 authenticates both the user and the transaction that are involved in the trusted transaction, before the unit 404 allows any access to the sensitive data and programs in the secure memory 408. Step 604 further comprises step 604A and 604B in which the transaction and the user are authenticated, respectively. In one embodiment of step 604A, the retailer is authenticated using a retailer key, and particularly, a challenge—response authentication is used. A random number is sent to the mobile device as a retailer key, and the secure element encrypts it using a key stored in the key storage. The encrypted retailer key is transmitted to the host that authenticates the retailer. The host check that the encrypted retailer key is conformal to its record, and the retailer is authenticated. In one embodiment of step 604B, the mobile terminal 100 tracks purchasing habits of the user, such that it sends warnings and requests confirmations when a suspicious request is received from an abnormal retailer. In another embodiment of step 604B, a series of personal questions are asked, and the user is required to answer them correctly. In one preferred embodiment of step 604B, personal information is automatically collected, analyzed and checked to ensure that the user is the legitimate owner of the mobile phone.

In a subsequent memory write operation, the cryptographic processor 406 encrypts sensitive data received from the secure processor 402 based on a second encryption method (step 606), and sometimes, generates integrity check data for the sensitive data according to another integrity check method. One or more encryption keys may be used in the encryption method. Both the encrypted data and security check data are thereafter stored in the secure memory 408 (step 608).

Likewise in a memory read operation, the cryptographic processor 406 read encrypted sensitive programs or data out from the secure memory 408 (step 610). The encrypted sensitive data is decrypted to original sensitive data according to a second decryption method (step 608). Both the second encryption and decryption methods are associated and serve to provide secure data storage within the secure memory 408. The integrity check data is retrieved together with the encrypted sensitive data, and validity of the sensitive data is checked based on the integrity check data prior to transferring the sensitive data to the secure processor 402 for further processing.

A trusted transaction may incorporate a plurality of read and write operations on the secure storage. In one embodiment, the user places a purchase order for a certain price in a retailer store. A credit card is selected for payment by the user on the mobile terminal 100. During verification, the user password and the retailer information are extracted from the secure memory 408 for comparison. The account information including card number, expiration date and customer information needs to be read from the secure memory 408, and transmitted to the remote server owned by the credit card company. Once the request of charge is sent to the credit card company, the payment may be saved in the credit card history stored in the secure memory 408. Moreover, various encryption keys applied for the first encryption/decryption method may also be securely stored in the secure storage 408 for different retailers or agents.

In the mobile terminal 100, the secure element 102 relies on various security countermeasures in both hardware and software levels to deter tamper attempts. The security mesh may be applied to enclose the secure element 102. The V/A unit 404 is used to introduce an extra authentication step to authenticate the user and the retailer that request access to the secure memory 408. Moreover, distinct encryption methods are used for data storage within the secure memory 408 and data communication from the secure element 102. Once any tamper attempt is detected in any of these security countermeasures, the ongoing transaction is automatically interrupted, and the sensitive data or programs are erased from the secure memory 408. As a result, the security level of the mobile terminal 100 is not only largely enhanced, and will potentially exceed that of the conventional POS terminals.

One of those skilled in the art will see that each mobile device 100 may comprise more than one secure element 102. Each of these secure elements 102 may be a specialized or generic secure element. Each specialized secure element 102 may be provided by a respective agent, and reserved for a particular high-security application. However, each generic secure element 102 does not have to be reserved for one retailer. In one embodiment, several retailers share one generic element 102. The secure memory 408 is partitioned to several regions each of which is associated with one retailer. The cryptographic processor 406 processes the sensitive data for each detailer using corresponding encryption, decryption and integrity check methods, and the V/A unit 404 verifies each retailer differently.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

I claim:

1. A secure element, comprising:
   a secure memory that stores a sensitive data;
   a secure processor that receives a request for a trusted transaction and processes the request, the trusted transaction being associated with an operation selected from writing the sensitive data into the secure memory and reading the sensitive data from the secure memory, the secure memory being coupled to and accessed by the secure processor only;
   a verification/authentication (V/A) unit, coupled to the secure processor, the V/A unit verifying and authenticating the trusted transaction and a user that makes the request as the secure processor receives the request for the trusted transaction; and
   wherein the secure element is embedded in a mobile device and authorized to process the trusted transaction, and an initial credential, provided by an entity that is different from a manufacturer of the mobile device and provides a user specific credential encrypted with the initial credential to authenticate the trusted transaction, is programmed into the secure element before the secure element is assembled into the mobile device and wherein the secure memory is a component separate from a memory that is coupled to and accessed by only a central processing unit of the mobile device.

2. The secure element according to claim 1, further comprising:
   a cryptographic processor, coupled between the secure processor and the secure memory, the cryptographic processor encrypting the sensitive data prior to writing the sensitive data into the secure memory and decrypting the sensitive data prior to reading the sensitive data from the secure memory.

3. The secure element according to claim 1, wherein the secure processor is coupled to a device selected from a group consisting of:
   the central processing unit that implements conventional functions within the mobile device, the central processing unit and the secure processor being coupled via a secure link; and
   a near field communication (NFC) modem, the NFC modem being coupled to an antenna and allowing the secure element to communicate through radio with other external NFC devices.

4. The secure element according to claim 1, wherein the secure element is a generic secure element that is not associated with a particular user or entity when the mobile device is delivered to the user, and the initial credential is used to authorize the entity to program the user specific credential and the V/A to verify authenticity of secure application software before its installation on the mobile device.

5. The secure element according to claim 1, wherein the secure element is a specialized secure element that is configured particularly for a high-security application when the mobile device is delivered to the user, the high-security application authorizing the user specific credential according to the initial credential.

6. The secure element according to claim 1, further comprising:
   a key storage, coupled to the cryptographic processor, the key storage providing a cryptographic key to the cryptographic processor to process the sensitive data; and
   a tamper monitor, coupled to the secure processor and the key storage, the tamper monitor detecting tamper attempts ranging from breaking through a physical anti-tamper security mesh to identifying a disguised fake identity use.

7. The secure element according to claim 1, wherein tamper attempts are constantly monitored, regardless of the mobile device being switched on and off.

8. The secure element according to claim 1, wherein the secure processor is coupled to a security indicator, the security indicator showing a security level on real time and sending warnings to the user once a tamper attempt is detected by the tamper monitor.

9. The secure element according to claim 1, wherein the V/A unit is coupled to a biometric sensor that collects a biometric data of the user, such that the user is verified and authenticated within the V/A unit based on the biometric data, and wherein the biometric data is selected from a group consisting of finger print, retina configuration, and voice feature.

10. A secure element, comprising:
    an interface to a processor, the processor implementing conventional functions for a mobile device and being configured with at least one privileged mode of program execution;
    a secure processor coupled to the processor via a secure link;
    a power management integrated circuit (PMIC), coupled to the processor, the PMIC implementing conventional power management functions and comprising a storage area where a cryptographic key and sensitive data are stored;
    wherein the cryptographic key and the sensitive data are provided to the processor such that in the at least one privileged mode of program execution, the processor is enabled to implement a trusted operation that is selected from a group consisting of identification (ID) document reading, identification (ID) document emulation, financial transaction, and user authentication; and
    wherein an initial credential is programmed into the secure element in a factory before the secure element is assembled into a mobile device in the factory and is provided by an entity that is different from a manufacturer of the mobile device and provides a user specific credential encrypted with the initial credential to authenticate the trusted operation.

11. The secure element of claim 10, wherein tamper attempts are constantly monitored, regardless of the mobile device being switched on and off.

12. A method of processing a trusted transaction in a secure element, comprising:
    receiving a request for the trusted transaction, the trusted transaction being associated with an operation selected from a write operation and a read operation, the sensitive data being written into a secure memory in a write operation and read from the secure memory in a read operation;
    processing the request for the trusted transaction;
    verifying and authenticating the trusted transaction and a user that makes the request;
    processing the sensitive data when the trusted transaction and the user are verified,
    wherein the sensitive data is encrypted and written into the secure memory in the write operation, and read from the secure memory and decrypted in the read operation;

wherein the secure element is embedded in a mobile device and authorized to process the trusted transaction, and an initial credential, provided by an entity that is different from a manufacturer of the mobile device, is programmed into the secure element in a factory before the secure element is assembled into the mobile device in the factory; and wherein the request includes a user specific credential that is encrypted with the initial credential and generated by the entity.

13. The method according to claim 12, wherein the secure element is coupled to a device selected from a group consisting of: a central processing unit that implements conventional functions within the mobile device, the central processing unit and the secure processor being coupled via a secure link; and a near field communication (NFC) modem, the NFC modem being coupled to an antenna and allowing the secure element to communicate through radio with other external NFC devices.

14. The method according to claim 12, wherein the secure element is a generic secure element that is not associated with a particular user or entity when the mobile device is delivered to the user, and the initial credential is used to authorize the entity to program the user specific credential and to verify authenticity of secure application software before its installation on the mobile phone.

15. The method according to claim 12, wherein the secure element is a specialized secure element that is configured particularly for a high-security application when the mobile device is delivered to the user.

16. The method according to claim 12, further comprising the step of monitoring tamper attempts ranging from breaking through a physical anti-tamper security mesh to identifying a disguised fake identity use.

17. The method according to claim 12, wherein the secure element is coupled to a security indicator, the security indicator showing a security level on real time and sending warnings to the user once a tamper attempt is detected.

18. The method according to claim 12, wherein the user is verified and authenticated using a biometric sensor that collects a biometric data, and the biometric data is selected from a group consisting of finger print, retina configuration, and voice feature.

19. The secure element according to claim 1, wherein the secure element is disposed between top and bottom ball grid array (BGA) packages of a power management integrated circuit (PMIC) chip in the mobile device and each of the top and bottom BGA packages includes a substrate having a physical anti-tamper security mesh.

20. The method according to claim 12, wherein the secure element is disposed between top and bottom ball grid array (BGA) packages of a power management integrated circuit (PMIC) chip within the mobile device and each of the top and bottom BGA packages includes a substrate having a physical anti-tamper security mesh.

* * * * *